(12) United States Patent (10) Patent No.: US 7,927,172 B1
Kirby et al. (45) Date of Patent: Apr. 19, 2011

(54) GAME CALL HOLDER

(76) Inventors: R. Christian Kirby, Springville, NY (US); David J. Thomas, Blasdell, NY (US)

( * ) Notice: Subject to any disclaimer, the term of this patent is extended or adjusted under 35 U.S.C. 154(b) by 390 days.

(21) Appl. No.: 12/157,186

(22) Filed: Jun. 6, 2008

(51) Int. Cl.
*A63H 5/00* (2006.01)
*A63H 33/40* (2006.01)
(52) U.S. Cl. .................. 446/418; 446/202; 224/148.7
(58) Field of Classification Search .......... 446/202–209, 446/397, 415–421; 224/448, 454, 456, 459, 224/461, 536, 148.7; 411/45
See application file for complete search history.

(56) References Cited

U.S. PATENT DOCUMENTS

| | | | | |
|---|---|---|---|---|
| 332,902 | A | * | 12/1885 | Hebbard ..................... 124/43 |
| 924,348 | A | * | 6/1909 | Green ........................ 232/41 E |
| 2,061,463 | A | | 11/1936 | Hall |
| 2,454,894 | A | | 11/1948 | Hook |
| 3,216,685 | A | | 11/1965 | Raymond |
| 3,441,986 | A | | 5/1969 | Pritchard |
| 3,837,767 | A | * | 9/1974 | Aller ....................... 417/423.14 |
| 4,405,312 | A | * | 9/1983 | Gross et al. .................... 604/29 |
| 5,094,579 | A | * | 3/1992 | Johnson ....................... 411/107 |
| 5,095,650 | A | | 3/1992 | DeMarco |
| 5,265,141 | A | * | 11/1993 | Kobsa ........................ 376/446 |
| 6,042,452 | A | | 3/2000 | Niebrugge |
| 7,614,532 | B1 | * | 11/2009 | Dague ....................... 224/148.7 |
| 2007/0155282 | A1 | | 7/2007 | De Sousa |

OTHER PUBLICATIONS

Cabela's, "TreestandBow and Gun Holders," web page advertisement at www.cabelas.com, May 15, 2008.
Ebay, "The Bleat Swing Maximize the Use of Your Bleat Can Call," web page advertisement at www.cgi.ebay.com, Aug. 25, 2008.
Quaker Boy, "Hunter's First Choice" 1999 Hunter's Catalog, advertisements for "Bleat-in-Heat Deer call" and "Bleat-in-Heat II Deer Call," 1999, p. 15.
Quaker Boy Game Calls advertisement, "New Products 1991," 1991.
Quaker Boy World Champion Game Calls and Accessories advertisement, "New for Ninety-Two," 1992.
Quaker Boy World Champion Calls product packaging for "Bleat-In-Heat Deer Call," 2001.
Primos Hunting Calls, Internet (primos.com) advertisement for "The Can 3 Pak," 2006.
Primos Hunting Calls, Internet advertisement (primos.com) for "The Original Can," 2006.
Primos product packaging and instructions for "Original 'The Can' Estrus Bleat Model No. 711," 2006.

* cited by examiner

*Primary Examiner* — Kien T Nguyen
(74) *Attorney, Agent, or Firm* — James C. Simmons

(57) ABSTRACT

A holder for a cylindrical game call or other object. A pair of opposed cooperating jaws made of acrylonitrile butadiene stryene or other spring material resiliently hold the call. A member is detachably attachable to a tree trunk or other structure, and the jaws are rotatable relative to said member so that the call may be easily rotated alternately between right-side-up and upside-down positions for making sounds, without the necessity of a hunter having to hold the call.

20 Claims, 5 Drawing Sheets

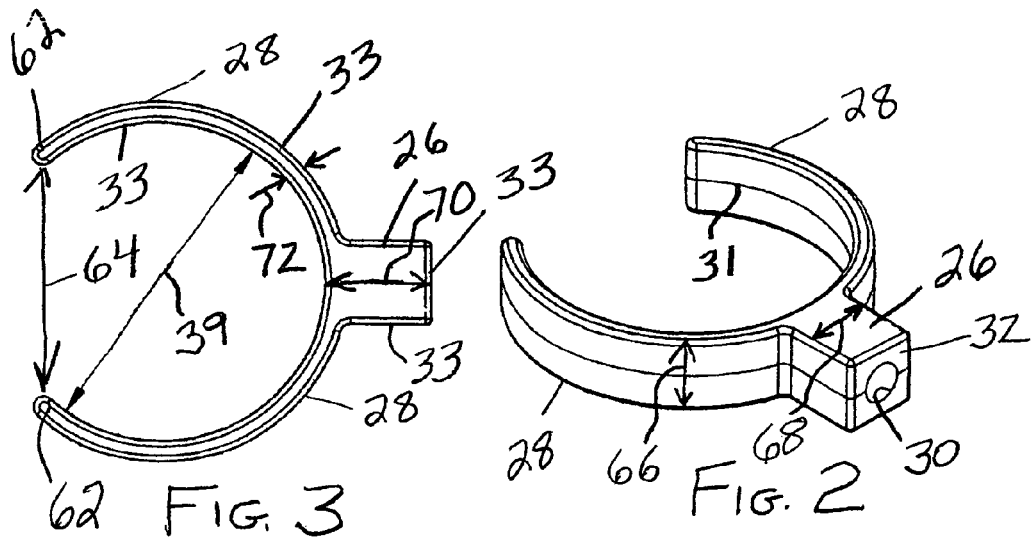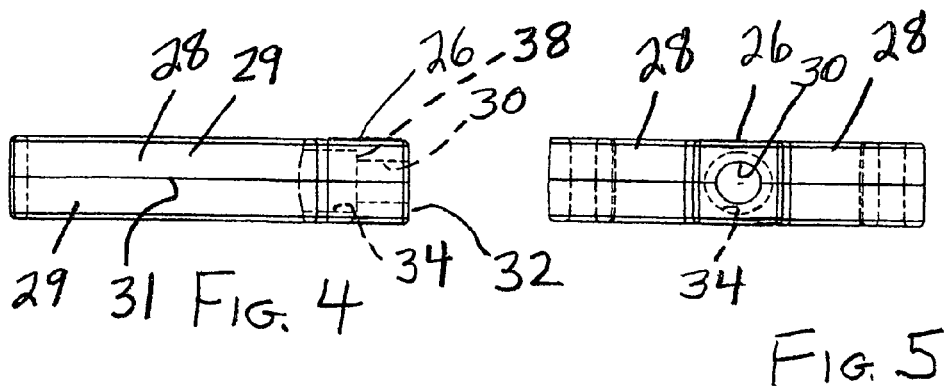

GAME CALL HOLDER

The present invention relates generally to game calls. More particularly, the present invention relates to a device for holding a game call.

Bow and gun holders have been provided by Cabela's Inc. which comprise hooks which are screwed at one end into tree trunks or the like. Various other holding devices, including devices having resilient clips for holding various items, are disclosed in U.S. Pat. No. 2,061,463; U.S. Pat. No. 2,454,894; U.S. Pat. No. 3,216,685; U.S. Pat. No. 3,441,986; U.S. Pat. No. 5,095,650; U.S. Pat. No. 6,042,452; and 2007/0155282, all of which are incorporated herein by reference. U.S. Pat. No. 5,095,650 discloses a support which is connected to a housing wall for growing of plants, wherein the support is made of flexible material and includes clips for embracing and supporting a fluorescent light. A resilient clip is shown to be semi-cylindrical, having two opposing portions extending from a stem. U.S. Pat. No. 6,042,452 discloses a footrest and turkey call device.

Quaker Boy, Inc., with which Applicants are affiliated, markets a game call, known as the Bleat in Heat call, which has a cylindrical casing. This call is illustrated at 10 in FIG. 1 of the appended drawings. By turning this call upside down, the desired sound is produced. In order to make another sound, the call is turned so that it is right side up, then turned upside down again.

It is considered to be desirable that the Bleat in Heat call or similar call be in a ready position without the hunter dropping it or having to place it in his or her pocket. But it is also desirable that the hunter not have to hold the call but instead be able to easily and quickly operate the call with, for example, one finger, and without further concern for the call once it is operated until it is desired to operate it again. This allows the hunter to focus on his or her hands immediately going to his or her weapon for making a shot, i.e., so that the hunter doesn't have to be fumbling around with the call as wild game approaches.

It is also considered desirable that a device for holding the call be portable, i.e., so that it can be easily removed and taken to a different hunting site.

U.S. published application 2007/0155282 discloses a hands-free animal call holder for calls such as the Bleat in Heat call. A foot pedal is connected to a base to effect rotation of a shaft which is attached to the call holder. The call holder is described as a bracket generally in the shape of a half-circle. The call is placed against the bracket and the call secured by a rubber strap. It is suggested that the invention may be secured to a tree stand or structure.

The holder of the above published application undesirably requires that the rubber strap be manipulated for attachment of the call thereto and undesirably provides complex structure for effecting rotation of the call for making sounds.

It is therefore considered desirable to provide a simple yet effective call holder which allows the call to be easily attachable thereto.

It is accordingly an object of the present invention to provide a game call holder which does not require manipulation of a rubber strap or the like for attachment of the call thereto.

It is a further object of the present invention to provide a simple yet effective game call holder which allows the call to be easily rotated between right-side-up and upside-down positions for making sounds, without the necessity of holding the call, but instead with the ability to easily and quickly operate the call with, for example, one finger, and without further concern for the call once it is operated until it is desired to operate it again.

In order to provide a game call holder which does not require manipulation of a rubber strap or the like for attachment of the call thereto, in accordance with the present invention, a call holder comprises a pair of opposed cooperating jaws having shape and resiliency to springedly embrace and grasp the call when inserted between the jaws.

In order that the holder may be simple yet effective so that the call may be easily rotated between right-side-up and upside-down positions for making sounds, without the necessity of holding the call, in accordance with the present invention, the call holder has a handle which is rotatably attachable to the jaw structure and which is in turn attachable to a tree or the like.

The above and other objects, features, and advantages of the present invention will be apparent in the following detailed description of the preferred embodiment thereof when read in conjunction with the appended drawings in which the same reference numerals depict the same or similar parts throughout the several views.

BRIEF DESCRIPTION OF THE DRAWINGS

FIG. 2 is a perspective view of the jaw structure of the holder.

FIG. 3 is a plan view of the jaw structure.

FIG. 4 is a side view of the jaw structure.

FIG. 5 is a rear view of the jaw structure.

DETAILED DESCRIPTION OF THE PREFERRED EMBODIMENT

Referring to FIGS. 1 to 11, there is shown generally at 20 a holder for cylindrical call 10, which has a diameter, illustrated at 11, of, for example, about 2 inches, more specifically, about 1⅞ inch (but may have any other suitable diameter). The holder 20 includes a jaw structure 22 and a handle structure 24 which attaches the jaw structure 22 to a tree, illustrated at 12, or other object.

Figure 1:
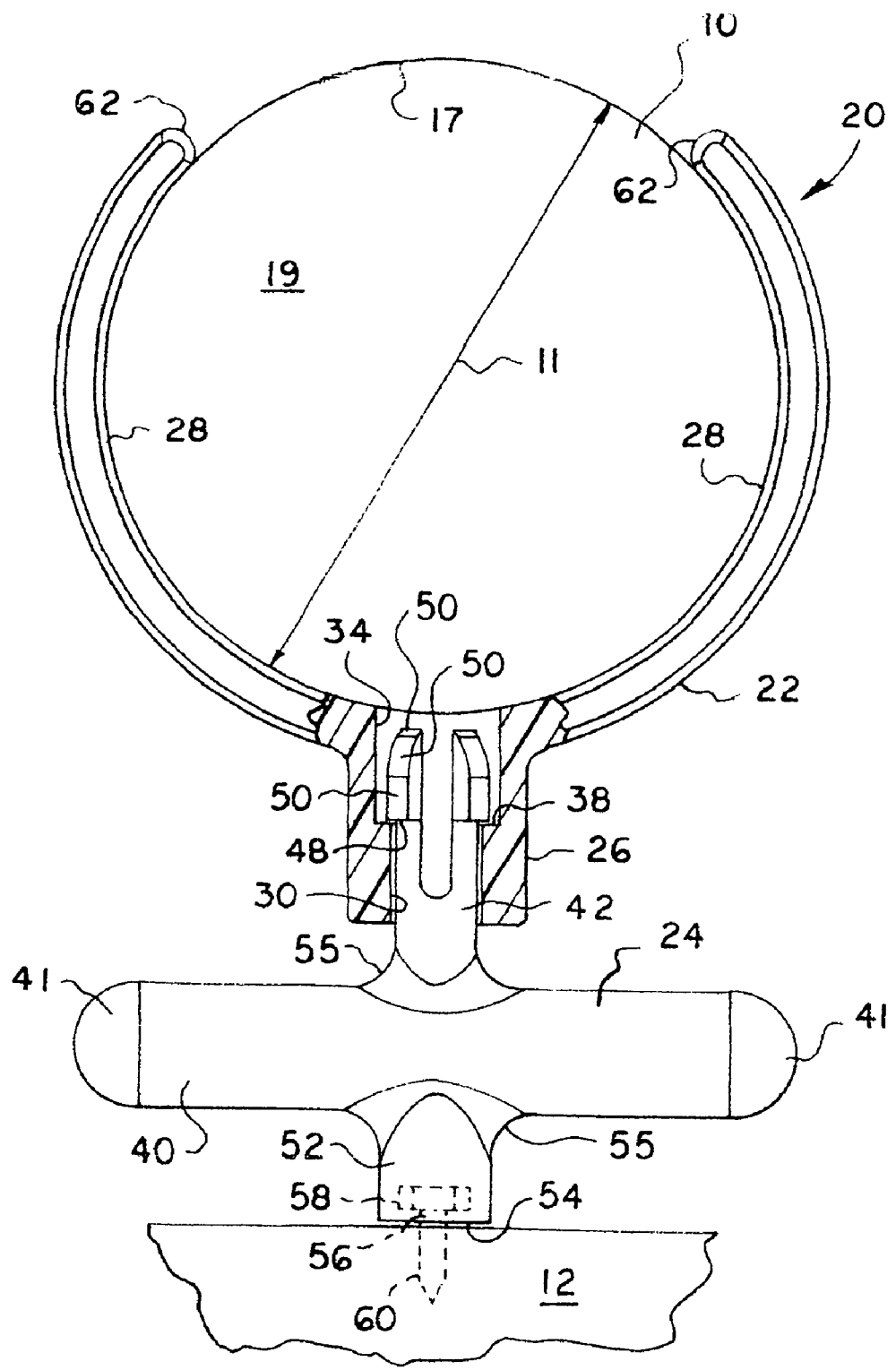
FIG. 1 is an enlarged plan view, partly in section, showing a game call holder which embodies the present invention, shown holding a game call and attached to a tree or other structure.
Figure 9:
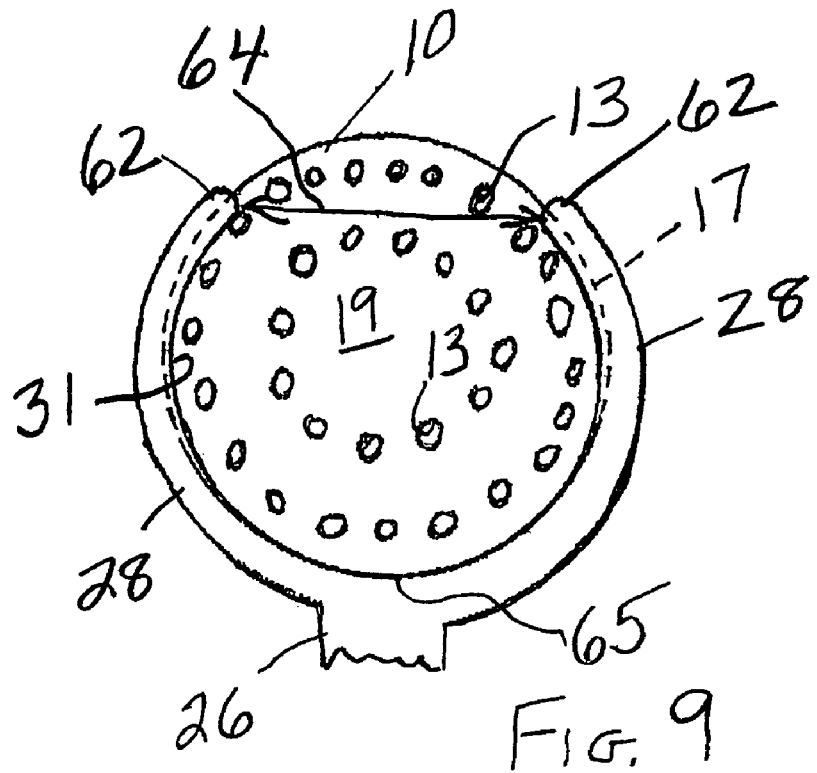
FIG. 9 is a detail partial plan view illustrating the geometrical relationship of the relaxed jaw structure to the game call when the game call is not being held by the jaw structure.
Figure 10:
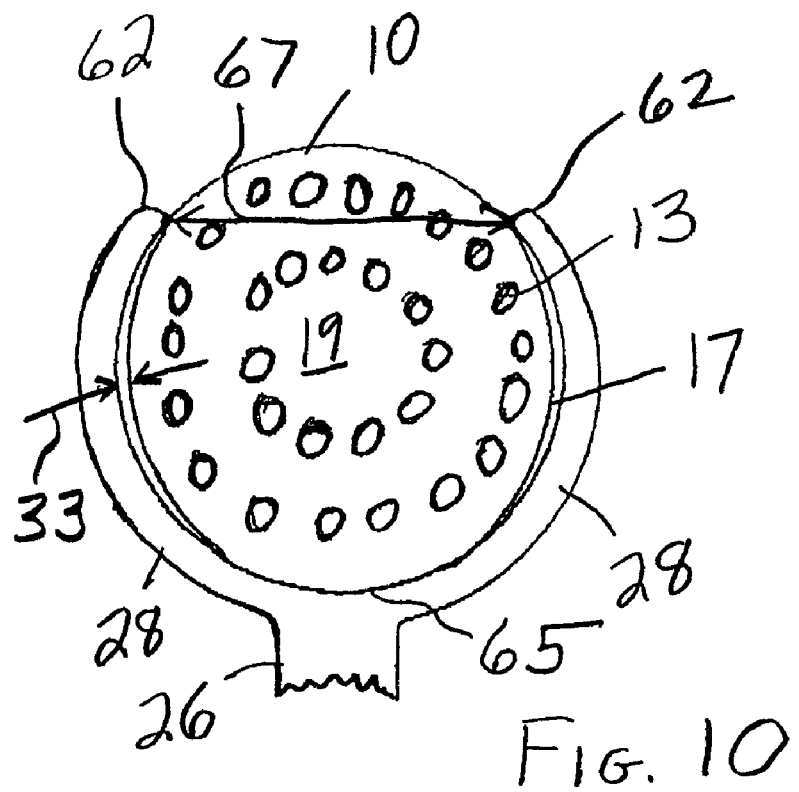
FIG. 10 is a view similar to that of FIG. 9 illustrating the geometrical relationship of the jaw structure to the game call while the game call is being held by the jaw structure.
Figure 12:
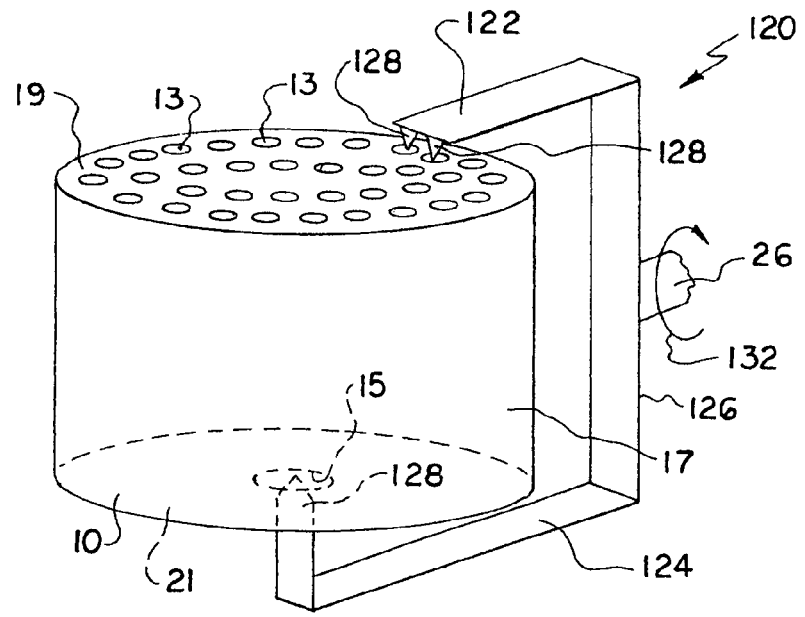
FIG. 12 is a schematic perspective view of an alternative embodiment of the jaw structure, shown holding the game call.

The game call 10 is a conventional call known as the Bleat in Heat call manufactured by Quaker Boy, Inc. of Orchard Park, New York, of which Applicants are affiliated, having a cylindrical wall or casing 17, a pair of end walls 19 and 21, air/sound outlet apertures, illustrated at 13 in FIGS. 9, 10, and 12, in one end wall 19, and an air inlet aperture, illustrated at 15 in FIG. 12, in the other end wall 21 (these apertures not shown in FIG. 1 for purposes of clarity). While the holder 20 is illustrated herein for such a cylindrical game call 10, it should be understood that the holder may be otherwise suitably constructed for game calls (or even other objects) of various other shapes. For example, a game call may have a cylindrical or otherwise suitably shaped interior but any shape exterior. An holder for such other game calls or objects is intended to come within the scope of the present invention as defined by the appended claims.

The jaw structure 22 is composed of a suitable molded plastic or other suitable material, as hereinafter discussed, and comprises a rear block portion 26 from which emanates a pair of opposed cooperating thin jaws 28 between which is grasped the call 10, the jaws and their make-up being discussed in greater detail hereinafter with reference to FIGS. 9 and 10. For example, the jaw structure 22 may be molded in two identical halves, illustrated at 29, which are then bonded or otherwise suitably attached together along bond line 31. The corners are suitably beveled, as illustrated at 33.

The block 26 has a central bore, illustrated at 30, extending inwardly from and through the rear surface 32 and connecting with an increased diameter central counter-bore, illustrated at 34, which extends to and through the inner surface 36, defining an internal shoulder 38. While the bores 30 and 34 are described as being "central," it should be understood that they may instead be off-center, and such off-center bores are intended to come within the bounds of the present invention as defined in the appended claims.

Figure 7:
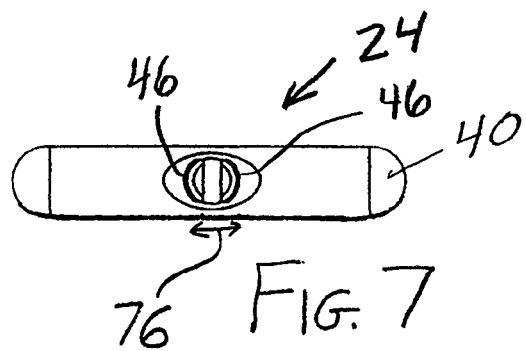
FIG. 7 is a front view of the handle structure.
Figure 6:
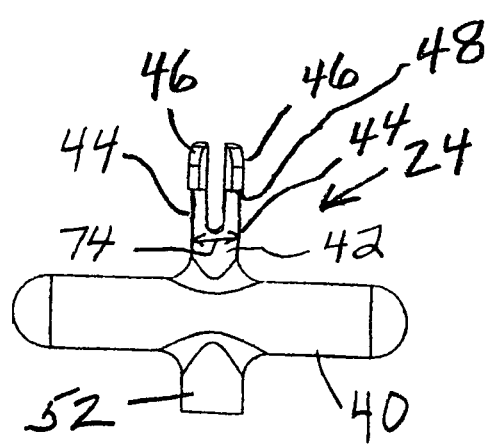
FIG. 6 is a plan view of the handle structure of the holder.
Figure 8:
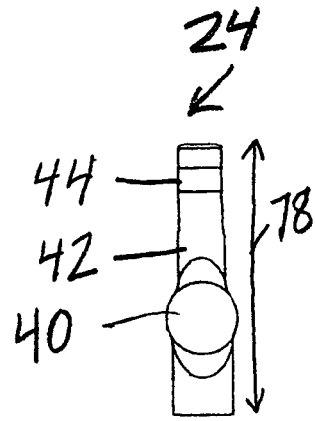
FIG. 8 is a side view of the handle structure.

The handle structure 24 is composed of a plastic or other suitable material similar to that of which the jaw structure 22 is composed. The handle structure 24 includes an elongate handle portion 40 having rounded end portions, illustrated at 41, and from which extends centrally and normal thereto a portion 42 from which extends a pair of split legs or prongs 44. Each leg terminates in a formation 46 which has a series of lands 50 stepped to define a tapered leg end portion and which is curved to extend laterally outwardly, as best seen in FIG. 7, defining a laterally outward shoulder 48.

As seen in FIG. 1, the portion 42 is sized to be removably and rotatably receivable within bore 30. The legs 44 are sized so that they may be pinched or squeezed toward each other so that they can also be received within bore 30. By thusly pinching the legs 44, the formations 46 can be pushed through the bore 30 and into the increased diameter bore 34 wherein they spring outwardly so that their shoulders 48 engage shoulders 38 to prevent their removal or passage back through bore 30 thereby retaining portion 42 within the bores 30 and 34 so that it is rotatable relative to bore 30. The portion 42 is removable by pinching on the legs 44 from the forward end of bore 34 so that their passage through bore 30 is initiated, and the handle structure 24 pulled outwardly (rearwardly) therefrom.

The handle structure or T-handle 24 has a block 52 extending centrally from the opposite side of the handle portion 40 so that it is aligned with the portion 42, the block 52 terminating in a terminal surface 54. The corners of the attachment of block 52 as well as the attachment of portion 42 to the handle portion 40 are suitably rounded, as illustrated at 55. A screw 56, made of stainless steel or other suitable material, is molded into the block 52 with the screw head 58 within the block 52 and the shank or threaded elongate portion 60 extending through the terminal surface 54. The screw head 58 is hex shaped or otherwise suitably shaped so that the plastic material molded around it will act to prevent it from turning. A preferred embodiment of the screw is discussed hereinafter with reference to FIG. 11.

The handle structure 24 is suitably attached to the tree trunk 12 or other suitable structure by turning the handle portion 40 to cause the screw 56 to threadedly engage the trunk 12. Then the legs 44 may be pinched to cause the jaw structure 22 to rotatably engage the handle structure 24, as previously discussed. It should of course be understood that, alternatively, the two pieces 22 and 24 may first be connected, then the handle structure 24 screwed into the tree trunk 12.

FIGS. 9 and 10 illustrate more precisely the relationship of the jaws 28 to the cylindrical call 10 when not holding the call (FIG. 9) and when holding the call (FIG. 10). As seen in FIG. 10, the jaws 28 are spread to cause their terminal ends 62 to hold or pinch the call 10, as illustrated at 63, between their contact points 63 and a central point, as illustrated at 65, midway between the ends 62, i.e., what might be described as a three-point pinch. For inserting the call 10, the jaws 28 are spread so that the distance therebetween increases from the distance illustrated at 64 in FIG. 9 (when relaxed) to the distance illustrated at 67 in FIG. 10 (when in tension holding the call 10). For example, the jaws 28 may be spread from the relaxed distance 64 of about 1⅜ inch (which is less than the diameter 11 of the call 10 to be received therebetween and held thereby) to the distance 67 of about 1½ inch (while in tension holding the call 10). Thus, while defining approximately the arc of a circle, the inner surfaces of the jaws 28, whether relaxed or in tension, are shown to not exactly define an arc of a circle. As seen in FIG. 9, while the inner surfaces 31 of the relaxed jaws 28 are shown to approximate a circle near point 65, their arcs deviate inwardly as the terminal ends 62 are approached. When spread in tension to hold the call 10, this results in a small gap, illustrated at 33, along each jaw 28 between points 62 and 65. The width of a gap 33 at the widest point may, for example, be about 0.003 inch. A jaw structure having a suitable jaw curvature to suitably pinch and hold the call 10 may be suitably constructed using principles commonly known to one of ordinary skill in the art to which the present invention pertains.

In order to achieve the desired tension for firmly pinching and holding the call 10 and the desired memory for returning to the relaxed state (as well as for achieving the desired flexibility and memory for the handle structure legs 44), it is important that the material of which the jaw structure 22 (or at least the jaws 28) is made have the desired spring effect to provide a suitable tension to the jaws 28 when holding the call 10 as well as memory to return substantially to the relaxed position of FIG. 9 (and also for the handle structure 24 or at least the legs 44 thereof to desirably afford the needed flexibility for the legs 44 for insertion thereof and the memory to return the legs 44 substantially to the relaxed position for holding the jaw structure 22 suitably to the handle structure 24). In order to provide the desired spring effects, in accordance with the present invention, the jaw structure 22 (or at least the jaws 28 thereof) and the handle structure 24 (or at least the legs 44 thereof) are composed of a suitable spring material such as, for example, spring plastic or spring steel or other suitable spring metal. For the purposes of this specification and the claims, the term "spring" is meant to refer to a material which has resilience and the ability to return substantially to its original or relaxed shape or form after being forced out of its relaxed shape. A suitable spring plastic material for both the jaw and handle structures 22 and 24 respectively has been found to be acrylonitrile butadiene stryene (ABS). It should of course be understood that the jaw and handle structures 22 and 24 respectively may be made of different spring materials.

With the handle structure 24 firmly attached to the tree trunk 12 or other suitable structure, the jaw structure 22 may then be easily turned, for example, with a single finger alternately between the right-side-up and upside-down positions to cause the call 10 to sound, without the necessity of having to hold onto or fumble with the call 10, leaving the hunter's hands free to immediately go to his or her weapon to make a shot. The holder 20 is also desirably portable in that one does not need to screw it into a tree trunk and leave it there; instead, it can be removed and taken to a different hunting site and re-installed in a tree trunk at the new hunting site.

The following are exemplary dimensions for a suitable holder 20 made of ABS plastic, it being understood that the holder 20 may be otherwise suitably sized and shaped. The jaw structure 22 has a height, illustrated at 66, of, for example, about 0.5 inch, and the block 26 has a width and length, illustrated at 68 and 70 respectively, of about 0.5 and 5/16 inch respectively. Each of the jaws 28 has a thickness, illustrated at 72, of, for example, about 1/8 inch. The distance 29 may, for example, be about 1.9 inch (for example, 1.8826 inch). The diameters of the bore and counter-bore 30 and 34 respectively are, for example, about 1/4 and 3/8 inch respectively and their lengths are, for example, each about 0.31 (such as 0.3103) inch. The overall length, illustrated at 78, of the handle structure 24 is, for example, about 1.41 inch. The handle 40 has a length and diameter of, for example, about 2 inches and 0.38 inch respectively and its ends radiused at, for example, about 0.19 inch. Portion 52 has a diameter and length of, for example, about 0.31 and 1/4 inch respectively. Portion 42 has a diameter, illustrated at 74, of, for example, about 0.24 inch. The width, illustrated at 76, across the formations 46, increases to, for example, about 9/32 inch. The length of each of the legs 44 is, for example, about 0.47 inch. The height of each of the formations 46 is, for example, about 0.25 inch. The distance between the legs 44 is, for example, about 0.09 inch.

Figure 13:
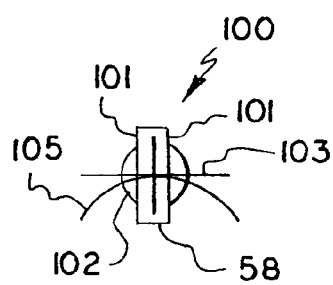
FIG. 13 is an end view of the screw of FIG. 12, taken along lines 13-13 of FIG. 12.
Figure 11:
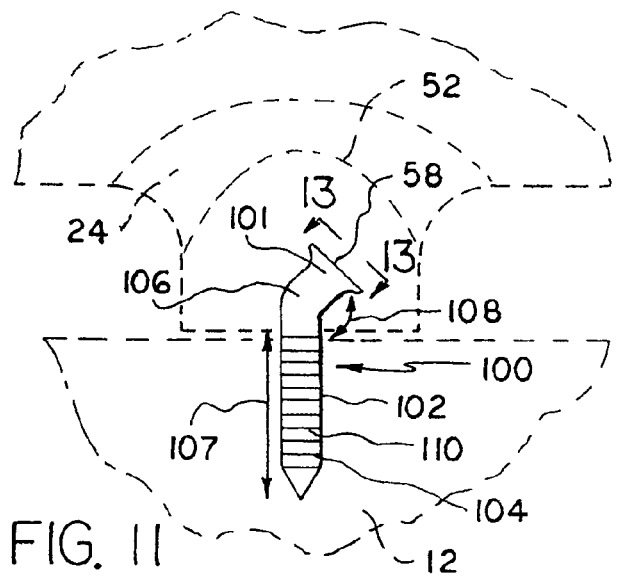
FIG. 11 is a side view of an alternative embodiment of a screw for holding the handle structure to a tree trunk.

Referring to FIGS. 11 and 13, there is shown generally at 100 a preferred embodiment of the wood screw (or other suitable screw) for attaching the handle structure 24 to a tree trunk 12 or other object. The screw 100 has a head 58 which has a pair of parallel flat sides 101, or may have an other suitable head. As seen in FIG. 11, the shank or elongate portion 102 containing at its terminal end portion 110 conventional screw threads 104 for threadedly engaging the tree trunk 12 is suitably formed so that its portion 106 adjacent the head 58 extends obliquely to the terminal end portion 110, i.e., at an angle, illustrated at 108, of, for example, about 135 degrees, and the angle 108 is preferably formed such that the flat faces or sides 101 face generally in the direction of rotation of the portion 52 or applied force as the portion 52 is turned, i.e., a line, illustrated at 103, normal or perpendicular to a face 101 is generally tangential to the direction, illustrated at 105, of rotation of the portion 52 or the direction in which force is applied as the portion 52 is turned. This oblique angle 108 and orientation of the screw faces 101 is provided to substantially increase the screw surface area against which force is applied by the plastic material molded about it as the screw 100 is screwed into the tree trunk 12 by turning the handle 24, thereby to increase the strength and durability of the screw/plastic interface. The screw 100 is, for example, a 300 series stainless steel 1½ inch #8 trim screw, and the shank 102 protrudes or extends from the portion 52 a distance, illustrated at 107, of, for example, about 1¼ inch.

Referring to FIG. 12, there is illustrated generally at 120 an alternative embodiment of the jaw structure (composed of a similar spring material as holder 20 is composed) having a pair of opposed cooperating resilient jaws 122 and 124 connected by a cross arm 126. As seen in FIG. 12, the upper jaw 122 has a pair (or one or other suitable number) of pyramid-shaped (or otherwise suitably shaped) contact point members 128 (molded thereon or otherwise suitably attached) for engaging corresponding apertures 13 in end wall 19 of call 10, and the lower jaw 124 has a similar pyramid-shaped (or otherwise suitably shaped) contact point member 128 for engaging the aperture 15 in the other end wall 21 of call 10 (and may of course have more than one contact point, depending on the application), thereby providing a stable three-point pinch. It should be understood that the terms "upper" and "lower" are with reference only to the jaw structure 120 as it is shown in FIG. 12 since the upper jaw will become the lower jaw and the lower jaw will become the upper jaw when the jaw structure 120 is turned 180 degrees, as illustrated at 132. By making the jaw structure 120 (or at least the jaws 122 and 124) of a spring material, similarly as previously discussed for holder 20, wherein the distance between the points of portions 128 when the jaw structure 120 is relaxed is less than the height of the call 10, the jaws 122 and 124 are spread and the point members 128 inserted into the apertures 13 and 15 respectively so that the end walls 19 and 21 are pinched to securely hold the call between the jaws 122 and 124. As can be seen from FIG. 12, this allows the call 10 to be shaped otherwise than cylindrical.

It should be understood that, while the present invention has been described in detail herein, the invention can be embodied otherwise without departing from the principles thereof, and such other embodiments are meant to come within the scope of the present invention as defined by the appended claims.

What is claimed is:

1. A holder for an object comprising a pair of opposed cooperating jaws composed of a spring material to resiliently hold the object, a member detachably attachable to a structure, said pair of jaws being rotatable relative to said member, and a fastener for detachably attaching said member to a structure, said member being molded of plastic material wherein the plastic material is molded about said fastener so that said fastener protrudes therefrom.

2. A holder according to claim 1 wherein said spring material is acrylonitrile butadiene stryene.

3. A holder according to claim 1 wherein said jaws when relaxed have inner surfaces which are arced to approximate an arc of a circle having a diameter of about 2 inches and have terminal ends which are spaced a distance equal to about 1 3/8 inch.

4. A holder according to claim 1 wherein said jaws have contact point members for engaging apertures in end walls respectively of a call.

5. A holder according to claim 1 further comprising a block to which said jaws are integrally attached, said block and said jaws composed of plastic material, and wherein said block is rotatably attachable to said member.

6. A holder according to claim 1 wherein the object is a game call.

7. A holder according to claim 1 wherein the object is a cylindrical game call.

8. A holder for an object comprising a pair of opposed cooperating jaws composed of a spring material to resiliently hold the object, a member detachably attachable to a structure, said pair of jaws being rotatable relative to said member, a screw including a head and a shank for detachably attaching said member to a structure, said shank having a portion adjacent said head and a terminal end portion for protruding from said member, said portion adjacent said head being oblique to said terminal end portion, and said member being molded of plastic material wherein the plastic material is molded about said screw head and said portion adjacent said head so that said terminal end portion protrudes therefrom.

9. A holder according to claim 8 wherein said spring material is acrylonitrile butadiene stryene.

10. A holder for an object comprising structure for holding the object, said holding structure including a block having a bore and a counterbore, a member detachably attachable to a structure, said member comprising an elongate portion including at least two pinchable resilient prongs having enlarged terminal heads which are sized when pinched to be passed through said bore and received in said counterbore to lockingly rotatable receive said elongate portion in said bore to allow rotation of said holding structure relative to said member, wherein said holding structure further includes a pair of opposed cooperating jaws attached to said block and composed of spring material to resiliently hold the object.

11. A holder according to claim 10 wherein said member is composed of acrylonitrile butadiene stryene.

12. A holder according to claim 10 wherein the object is a game call.

13. A holder for an object comprising structure for holding the object, said holding structure including a block having a bore and a counterbore, a member detachably attachable to a structure, said member comprising an elongate portion including at least two pinchable resilient prongs having enlarged terminal heads which are sized when pinched to be passed through said bore and received in said counterbore to lockingly rotatably receive said elongate portion in said bore to allow rotation of said holding structure relative to said member, a screw including a head and a shank for detachably attaching said member to a structure, said shank having a portion adjacent said head and a terminal end portion for protruding from said member, said portion adjacent said head being oblique to said terminal end portion, and said member being molded of plastic material wherein the plastic material is molded about said screw head and said portion adjacent said head so that said terminal end portion protrudes therefrom.

14. In combination with a game call, a holder of said game call, said holder comprising a pair of opposed cooperating jaws made of a spring material for resiliently holding said game call, a member detachably attachable to a structure, and said pair of jaws being rotatable relative to said member, wherein said game call has end walls each having apertures therein, and said jaws have contact point members for engaging said apertures in said end walls respectively for holding said game call.

15. A holder according to claim 14 wherein said game call has a cylindrical wall, and said jaws are formed to pinch said cylindrical wall to hold said game call.

16. A holder according to claim 14 wherein said jaws are composed of acrylonitrile butadiene stryene.

17. In combination with a game call, a holder of said game call, said holder comprising a pair of opposed cooperating jaws made of a spring material for resiliently holding said game call, a member detachably attachable to a structure, and said pair of jaws being rotatable relative to said member, wherein said game call is cylindrical, wherein said jaws have inner surfaces which are curved to together define an arc which approximates the arc of a circle having a diameter which is equal to a diameter of said game call, and wherein said jaws have terminal ends which when relaxed are spaced a distance equal to less than a diameter of said game call.

18. A holder according to claim 17 wherein said spring material is acrylonitrile butadiene stryene.

19. In combination with a game call, a holder of said game call, said holder comprising a pair of opposed cooperating jaws made of a spring material for resiliently holding said game call, a member detachably attachable to a structure, and said pair of jaws being rotatable relative to said member, a block to which said jaws are attached and having a bore and a counterbore, said member comprising an elongate portion including at least two pinchable resilient prongs having enlarged terminal heads which are sized when pinched to be passed through said bore and received in said counterbore to lockingly rotatably receive said elongate portion in said bore to allow rotation of said block relative to said member.

20. A holder according to claim 19 wherein said spring material is acrylonitrile butadiene stryene.

* * * * *